(12) United States Patent
Kansal et al.

(10) Patent No.: US 8,903,955 B2
(45) Date of Patent: Dec. 2, 2014

(54) SYSTEMS AND METHODS FOR INTELLIGENT VIDEO DELIVERY AND CACHE MANAGEMENT

(75) Inventors: Vivek Kansal, San Jose, CA (US); Timothy Stammers, Raleigh, NC (US); Bhaskar Bhupalam, Santa Clara, CA (US); Biswaranjan Panda, Santa Clara, CA (US); Jayaraman Iyer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 13/309,874

(22) Filed: Dec. 2, 2011

(65) Prior Publication Data

US 2013/0144979 A1    Jun. 6, 2013

(51) Int. Cl.
*G06F 15/16* (2006.01)
*H04L 29/06* (2006.01)
*H04N 21/24* (2011.01)
*H04N 21/2343* (2011.01)

(52) U.S. Cl.
CPC .... *H04L 65/4084* (2013.01); *H04N 21/234309* (2013.01); *H04N 21/2402* (2013.01)
USPC .......... 709/219; 709/227; 709/228; 709/231; 707/756

(58) Field of Classification Search
CPC ................... H04L 65/4084; H04N 21/234309; H04N 21/2402
USPC ............... 709/219, 227–228, 231; 455/456.2; 707/756
See application file for complete search history.

(56) References Cited

U.S. PATENT DOCUMENTS

| | | |
|---|---|---|
| 6,138,156 A | 10/2000 | Fletcher et al. |
| 6,345,294 B1 | 2/2002 | O'Toole et al. |
| 6,431,875 B1 | 8/2002 | Elliott et al. |
| 6,449,647 B1 | 9/2002 | Colby et al. |
| 6,477,590 B1 | 11/2002 | Habusha et al. |
| 6,687,252 B1 | 2/2004 | Bertrand et al. |
| 6,714,987 B1 | 3/2004 | Amin et al. |
| 6,775,273 B1 | 8/2004 | Kung et al. |
| 6,778,494 B1 | 8/2004 | Mauger |
| 6,847,991 B1 | 1/2005 | Kurapati |
| 6,850,982 B1 | 2/2005 | Siegel |

(Continued)

FOREIGN PATENT DOCUMENTS

WO    WO-0122642 A2    3/2001

OTHER PUBLICATIONS

Berners-Lee T. et al. "Hypertext Transfer Protocol—HTTP/1.0" Network Working Group. May 1996. 61 pages.

(Continued)

*Primary Examiner* — Hitesh Patel
(74) *Attorney, Agent, or Firm* — Wilmer Cutler Pickering Hale and Dorr LLP

(57) ABSTRACT

Network operators are striving to find ways to provide stable video services amid a rapid increase in video data traffic. In order to provide stable video services with constrained network resources, network operators attempted to reduce video file sizes and to cache videos for future use. However, network operators failed to exploit user information and to leverage benefits of distributing these functionalities across the network. This disclosure provides systems and methods for efficiently delivering video and managing video caches by exploiting user information and by distributing video delivery functionalities across the network.

20 Claims, 12 Drawing Sheets

(56) References Cited

U.S. PATENT DOCUMENTS

| | | |
|---|---|---|
| 6,853,630 B1 | 2/2005 | Manning |
| 6,854,014 B1 | 2/2005 | Amin et al. |
| 6,888,821 B2 | 5/2005 | Rasanen et al. |
| 6,973,309 B1 | 12/2005 | Rygula et al. |
| 7,100,192 B1 | 8/2006 | Igawa et al. |
| 7,450,531 B2 | 11/2008 | Iyer et al. |
| 7,454,206 B1 | 11/2008 | Phillips et al. |
| 7,486,658 B2 | 2/2009 | Kumar |
| 7,680,755 B2 | 3/2010 | Machani |
| 7,689,688 B2 | 3/2010 | Iwamoto |
| 7,707,300 B1 | 4/2010 | Champagne |
| 7,724,753 B2 | 5/2010 | Naqvi et al. |
| 7,782,851 B2 | 8/2010 | Zhao et al. |
| 7,813,759 B2 | 10/2010 | Virgile |
| 7,855,982 B2 | 12/2010 | Ramankutty et al. |
| 7,890,586 B1 | 2/2011 | McNamara et al. |
| 7,945,648 B2 | 5/2011 | Tan |
| 7,966,645 B2 | 6/2011 | Panda et al. |
| 8,010,984 B2 | 8/2011 | Thukral |
| 8,289,983 B2 | 10/2012 | Wang |
| 8,307,390 B2 | 11/2012 | Holden |
| 8,321,905 B1 | 11/2012 | Streeter et al. |
| 8,387,089 B1 | 2/2013 | Kunkel et al. |
| 8,392,530 B1 | 3/2013 | Manapragada et al. |
| 8,639,718 B2 | 1/2014 | Bhupalam et al. |
| 2002/0029260 A1 | 3/2002 | Dobbins et al. |
| 2002/0131404 A1 | 9/2002 | Mehta et al. |
| 2003/0016630 A1 | 1/2003 | Vega-Garcia et al. |
| 2003/0110234 A1* | 6/2003 | Egli et al. .................. 709/217 |
| 2003/0133448 A1 | 7/2003 | Frink et al. |
| 2004/0039820 A1 | 2/2004 | Colby et al. |
| 2004/0047290 A1 | 3/2004 | Komandur et al. |
| 2004/0111476 A1 | 6/2004 | Trossen et al. |
| 2005/0005025 A1 | 1/2005 | Harville et al. |
| 2005/0132214 A1 | 6/2005 | Naftali |
| 2005/0136942 A1* | 6/2005 | Timiri et al. ............... 455/456.1 |
| 2005/0223248 A1 | 10/2005 | Lim et al. |
| 2005/0246278 A1* | 11/2005 | Gerber et al. .................. 705/44 |
| 2005/0251848 A1 | 11/2005 | Al-Janabi |
| 2006/0010226 A1 | 1/2006 | Hurtta et al. |
| 2006/0031559 A1 | 2/2006 | Sorokopud et al. |
| 2006/0088011 A1 | 4/2006 | Iyer et al. |
| 2006/0218301 A1 | 9/2006 | O'Toole et al. |
| 2007/0022199 A1 | 1/2007 | Tatsubori |
| 2007/0025325 A1 | 2/2007 | Kumar |
| 2007/0061469 A1 | 3/2007 | Rhim et al. |
| 2008/0137541 A1 | 6/2008 | Agarwal et al. |
| 2008/0155560 A1 | 6/2008 | Iwamoto |
| 2009/0100175 A1* | 4/2009 | Goerge et al. .................. 709/224 |
| 2009/0268655 A1 | 10/2009 | Bertz et al. |
| 2009/0282458 A1* | 11/2009 | Hjelm .......................... 726/1 |
| 2009/0320077 A1 | 12/2009 | Gazdzinski |
| 2010/0211983 A1 | 8/2010 | Chou |
| 2010/0211987 A1 | 8/2010 | Chou |
| 2010/0226428 A1 | 9/2010 | Thevathasan et al. |
| 2010/0281042 A1* | 11/2010 | Windes et al. ................ 707/756 |
| 2010/0325674 A1 | 12/2010 | Liu |
| 2011/0072466 A1 | 3/2011 | Basso et al. |
| 2011/0154477 A1 | 6/2011 | Parla et al. |
| 2011/0203006 A1 | 8/2011 | Gopalakrishnan |
| 2011/0289108 A1* | 11/2011 | Bhandari et al. .............. 707/769 |
| 2011/0299606 A1* | 12/2011 | Chen et al. .............. 375/240.26 |
| 2012/0054664 A1* | 3/2012 | Dougall et al. ............... 715/772 |
| 2012/0054809 A1 | 3/2012 | Chowdhury et al. |
| 2012/0203861 A1 | 8/2012 | Flack et al. |
| 2012/0265901 A1 | 10/2012 | Swenson et al. |
| 2013/0144906 A1 | 6/2013 | Bhupalam et al. |
| 2014/0082144 A1* | 3/2014 | Ramamurthy et al. ....... 709/219 |

OTHER PUBLICATIONS

Fielding R. et al. "Hypertext Transfer Protocol—HTTP/1.1" Network Working Group. Jun. 1999. 114 pages.

CTLabs Report, "SIP and RTP Denial of Service Attack Tests Summary." pp. 1-4. 2005. 4 pages.

http://www.3gpp.org, 3GPP TS 24.229 V6. 12.0 (Sep. 2006), pp. 1-304. Oct. 3, 2006. 304 pages.

http://www.3gpp.org/ftp/Specs/html-info/24229.htm printed Jan. 13, 2011. 4 pages.

No Author Listed. "Net-SAFE—the security requirements framework for SBCs" Net-SAFE. Dec. 5, 2009. 4 pages.

* cited by examiner

| Video identifier | API | Popularity index |
|---|---|---|
| | 1 | 12 |
| "http://www.youtube.com/watch?v=HPPj6viIBmU" | 2 | 27 |
| | 3 | 24 |
| | 4 | 64 |
| | 5 | 11 |
| | 1 | 9 |
| "http://www.youtube.com/watch?v=CYdyKqIpCr0" | 2 | 16 |
| | 3 | 42 |
| | 4 | 45 |
| | 5 | 15 |

FIG. 5

| Video identifier | API | Source address | Expiration time |
|---|---|---|---|
| "http://www.youtube.com/watch?v=HPPj6viIBmU" | 1 | | |
| | 2 | CDN_2/HPPj6viIBmU | 2011/08/09 |
| | 3 | CDN_3/HPPj6viIBmU | 2011/10/08 |
| | 4 | CDN_4/HPPj6viIBmU | 2011/10/15 |
| | 5 | | |
| "http://www.youtube.com/watch?v=CYdyKqlpCr0" | 1 | | |
| | 2 | | |
| | 3 | CDN_3/CYdyKqlpCr0 | 2011/10/13 |
| | 4 | CDN_4/CYdyKqlpCr0 | 2011/10/15 |
| | 5 | | |

FIG. 6

SYSTEMS AND METHODS FOR INTELLIGENT VIDEO DELIVERY AND CACHE MANAGEMENT

RELATED APPLICATION

The present application is related to U.S. patent application Ser. No. 13/309,711 by Bhupalem et al., filed on an even date herewith, entitled "SYSTEMS AND METHODS FOR CLIENT TRANSPARENT VIDEO READDRESSING", which is hereby incorporated by reference in its entirety. The present application is also related to U.S. patent application Ser. No. 13/252,574, by Hsu et al., filed on Oct. 4, 2011, entitled "SYSTEMS AND METHODS FOR CORRELATING MULTIPLE TCP SESSIONS FOR A VIDEO TRANSFER", which is herein incorporated by reference in its entirety.

FIELD OF THE DISCLOSURE

This disclosure relates generally to a system and method for delivering videos and managing a video cache in a content distribution network (CDN).

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipments, including, for example, satellite communications systems, portable digital assistants (PDAs), laptop computers, and user equipments (e.g., cellular telephones, user equipment). Such devices can connect to a network (e.g., the Internet) as long as the user is within range of such a wireless communication technology. Such devices can use connections to the wireless networks to download video data.

The increase in video data traffic can strain wireless network operators' existing packet core elements. The increase in video data traffic can overload network devices in wireless networks, and it may even cause wireless network service disruptions. The demand for video data over wireless networks is not expected to slow, especially as mobile devices become more sophisticated and as users become more dependent on mobile devices.

BRIEF DESCRIPTION OF THE DRAWINGS

FIG. 5 illustrates a popularity table in accordance with certain embodiments;

FIG. 6 illustrates a content distribution network (CDN) cache table in accordance with certain embodiments;

DESCRIPTION OF EXAMPLE EMBODIMENTS

Overview

Figure 1:
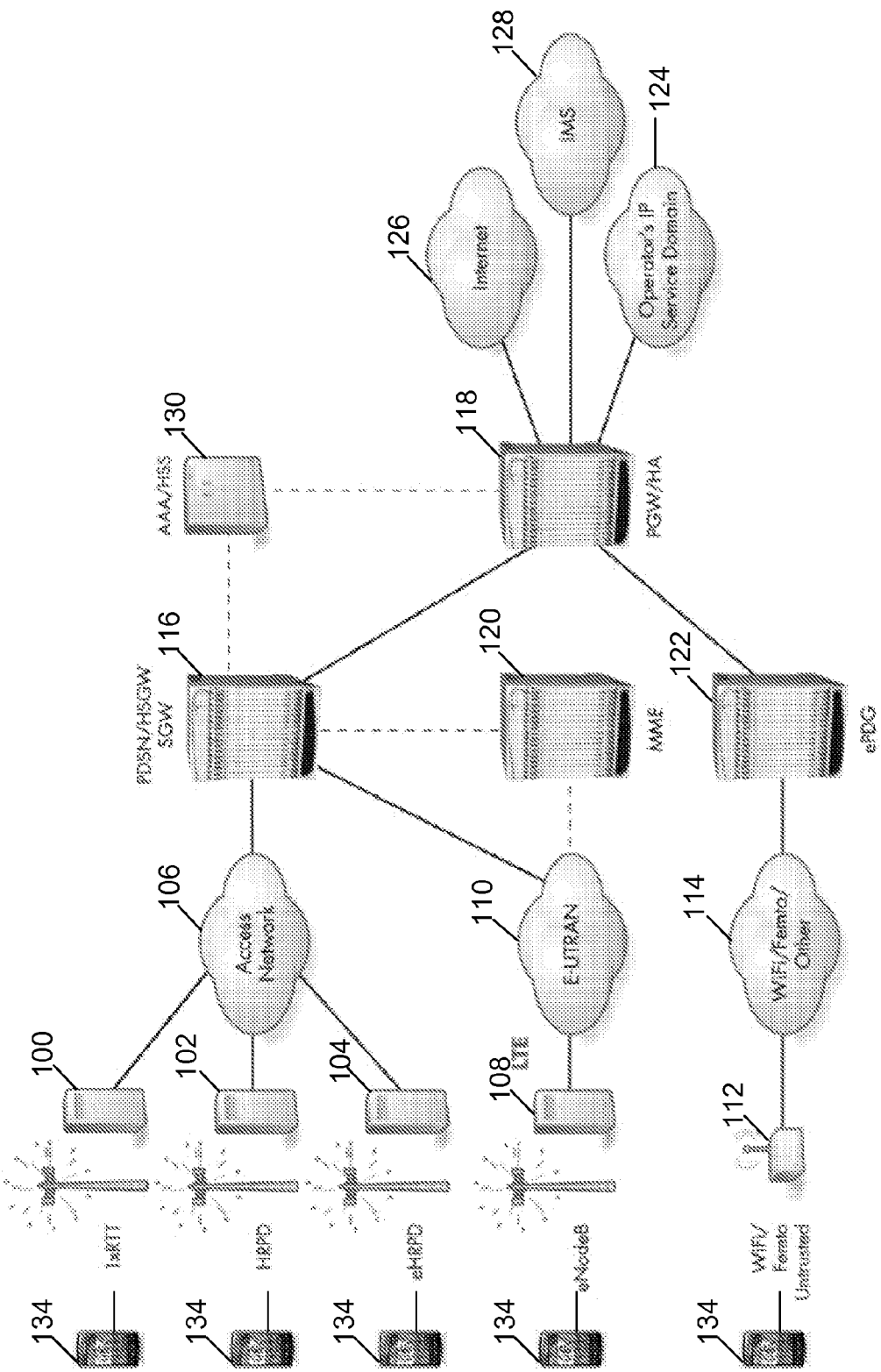
FIGS. 1-2 illustrate a communications network including a long term evolution (LTE) topology in accordance with certain embodiments.

Certain embodiments disclose a method including receiving a first video request from a user equipment, where the first video request includes a video identifier of a video requested by the user equipment. The method further includes receiving, from a policy server, a network policy associated with the user equipment and analyzing the first video request to determine video capabilities associated with the user equipment. In addition, the method includes determining a level of adaptation for the video based on one or more of the network policy or the video capabilities associated with the user equipment. The method further includes sending a content location request to an asset information manager (AIM), where the content location request includes the video identifier and the level of adaptation to be associated with the video. And the method includes receiving a content location response from the AIM, where the content location response identifies a source device from which to receive a version of the video adapted according to the level of adaptation.

Example Embodiments

In order to provide stable video services with constrained network resources, network operators have attempted to adapt videos before delivering them to users. Suppose that a network operator receives a request for a high definition (HD) video (i.e., 1920×1080 pixels), but because the network is busy, the network operator cannot stream the HD video in real-time. Network operators could still deliver the video in real-time by adapting the video to the network condition. One way to adapt the video is to reduce its file size. Reducing the file size can involve down-sampling the video, for example, to 1280×720 pixels, adjusting the video quality (e.g., compression rates, color depths), or adjusting frame rates (e.g., the number of frames per second).

Adjusting a video to reduce the file size is often called video transcoding. Video transcoding can involve modifying the video compression format. For instance, if user equipment supports a compression format that is more efficient than the video's current compression format, the video can be decompressed and re-compressed using the more efficient compression format. Network operators can perform video transcoding using a content adaptation engine (CAE). A CAE can be a stand-alone hardware module located between a gateway and a video server. A CAE may be a stand-alone hardware module because video transcoding is a computation-extensive operation. In some cases, a CAE can be emulated using software solutions running on a cloud or a data center.

To prepare an adapted video using a CAE, network operators can implement a mechanism to perform a number of operations on video data. The CAE operations can include retrieving an original, unmodified video from a video server, sending the original video to the CAE, adapting the original video into an adapted video using the CAE, and delivering the adapted video from the CAE. These CAE operations can be coordinated by a gateway through messages exchanged with the CAE.

Existing video transcoding schemes can have inefficiencies. If a network operator adapts videos without considering the requester's network subscription policy or the user equipment's video capabilities, such a blind adaptation scheme can sacrifice network efficiency. For instance, consider the previous example, but this time, suppose that the user requesting the video has user equipment with a video graphics array (VGA) display (i.e., 640×480 pixels). If the network operator simply delivers to the user equipment a video with 1280×720 pixels, the user equipment has to down-sample the received video to 640×480 pixels before displaying the video. Therefore, delivering a high quality video can not only incur additional network traffic, but also incur additional computation at the user equipment.

If network operators use a single network device for both video adaptations and video popularity tracking/video caching, and this network device is located at the edge of the operators' network, the original, large video travels a limited distance in the operators' network. However, this network device cannot effectively track popularity of videos because this network device handles only a limited amount of data traffic; therefore, the popularity statistics gathered by this network device is at best biased.

The disclosed systems and methods illustrate an intelligent video delivery (IVD) scheme that addresses these issues. The goal of the IVD scheme is to provide a communications network architecture that can accommodate efficient video delivery. The IVD scheme improves the video delivery by adapting videos based on delivery scenarios, caching adapted videos based on the videos' popularity, and distributing these functionalities across the communications network.

Under the IVD scheme, to reduce unnecessary data traffic, network operators can adapt videos based on a delivery scenario. The delivery scenario can include, among other things, the video capability of the video requestor (i.e., the user equipment requesting the video) and the network subscription policy associated with the video requestor. The video capability of the video requestor relates to, among other things, the video requestor's display resolution and/or the video codec capabilities, and the network subscription policy relates to, among other things, the eligible maximum data rate service.

In addition, under the IVD scheme, network operators can cache adapted versions of popular videos so that network operators do not have to adapt popular videos multiple times. For example, if a certain video is requested many times under a certain delivery scenario, the network operator can prepare a video adapted for that particular delivery scenario, store the adapted video at a cache in a content distribution network ("a CDN cache"), and deliver the adapted video directly from the CDN cache.

In certain embodiments, network operators can adapt potentially popular videos even before receiving any requests for those videos. This feature is particularly useful when a video content is popular among many users under a certain delivery scenario and there is a high expectation that the same video content would be popular in other delivery scenarios. For example, if a YouTube video is popular among users of a particular tablet computer, there is a high expectation that the same YouTube video would be popular among phone users from the same maker as the table. Therefore, network operators can prepare for such a future demand by adapting the YouTube video for the phone users even before receiving any requests from the phone users.

Network operators can carry out these operations in a distributed manner. In some embodiments, network operators track video popularity using a network device at a data center. Because this network device services a larger number of users compared to that of a network device at an edge of the service area (e.g., an edge gateway), the popularity statistics gathered by this network device at the data center is more accurate. In addition, in some embodiments, network operators can prepare adapted videos in the background. When a video becomes popular, network operators can prepare an adapted version of the popular video at the data center in the background, and store the adapted video at a CDN cache. Because this video adaptation occurs in the background, the video adaptation does not incur much delay to users.

FIG. 1 illustrates a communications network that implements an intelligent video delivery (IVD) scheme in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology, can use a transceiver shown generally at 112 to connect user equipment 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA), and a mobility management entity (MME) 120. On the access network side, the anchor gateway 118 can also communicate with an evolved packet data gateway (ePDG) 122 that provides connectivity to the WiFi/Femto/other transceiver 112. On the packet core side, the anchor gateway can communicate with the operator's IP service domain 124, the internet 126, IP multimedia subsystem (IMS) 128, a data center 132, and a video server 136. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving the user equipment. Even when the user equipment 134 is detached from the network, the HSS 130 maintains the binding information until the user equipment 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communications network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Network Access Server (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
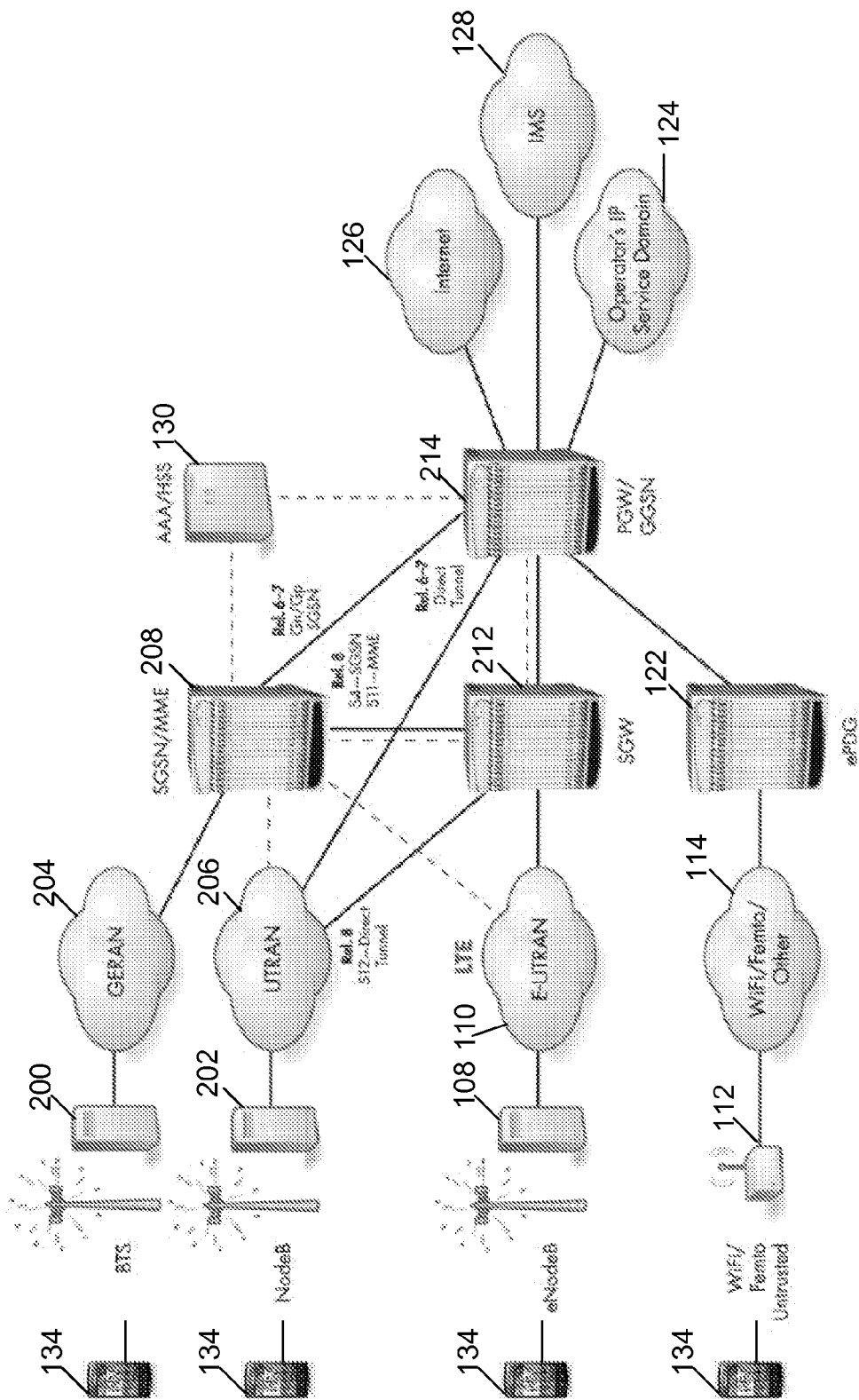

FIG. 2 illustrates a communications network that implements an intelligent video delivery (IVD) scheme in accordance with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, parts of the intelligent video delivery (IVD) system can be implemented on gateways, such as PGW/HA 118, PDSN/HSGW/SGW 116, SGSN/MME 208, PGW/GGSN 214, or SGW 212 and/or data centers 132. The gateways can access and maintain information relating to the communication session, the subscriber, the radio bearers, and the policies relating to the communication session. The gateways may be used to provide various services to user equipment 134 and implement the quality of service (QoS) on packet flows. Several of these functions are used in providing, for example, voice over IP (VoIP) routing and enhanced services, such as enhanced charging, stateful firewalls, traffic performance optimization (TPO). The communications networks also allow provision of applications such as VoIP, streaming video, streaming music, multi-user gaming, location based services, and a variety of delivered to a mobile node. Residing within the gateways can be one or more network processing units, line cards, as well as packet and voice processing cards.

Figure 3:
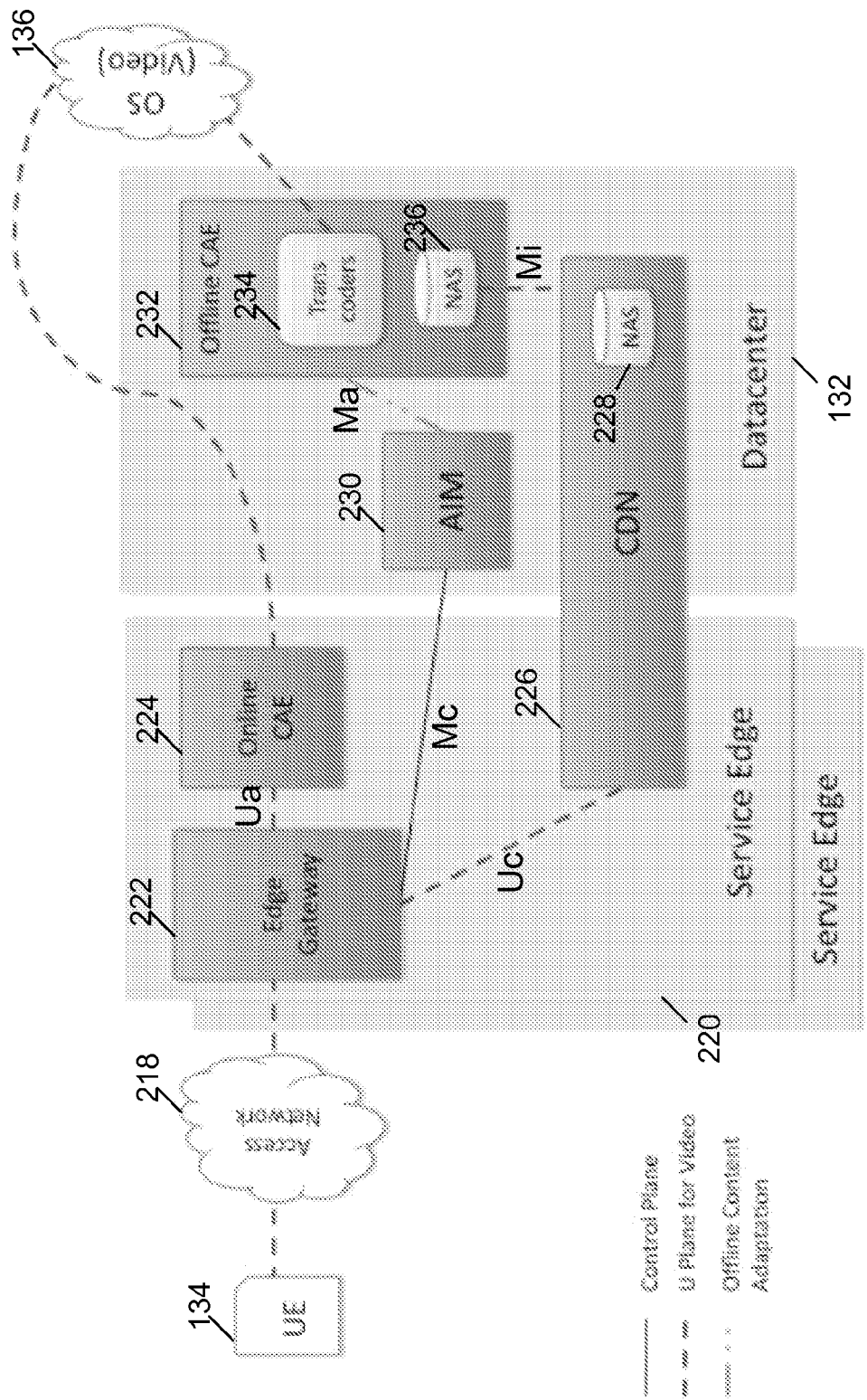
FIG. 3 illustrates a communications network in which an intelligent video delivery scheme is implemented in accordance with certain embodiments.

FIG. 3 illustrates a communications system that implements an intelligent video delivery (IVD) scheme in accordance with certain embodiments. FIG. 3 includes user equipment (UE) 134, an access network 218, a service edge 220 that includes an edge gateway 222, an online content adaptation engine (CAE) 224, and a portion of a content distribution network (CDN) 226, a CDN cache 228, which includes a network attached storage in a CDN 226, and a data center 132 that includes an asset information manager (AIM) 230, an offline content adaptation engine 232, at least one audio/video transcoder 234 in the offline CAE 232, a cache 236 associated with the offline CAE 232, and a video originating server (OS) 136.

A network device can communicate with other network devices over interfaces. For example, the edge gateway 222 can communicate with the AIM 230 over a control plane interface such as an Mc interface, with an online CAE 224 over a user plane interface such as an Ua interface, and with a CDN 226 and its components over a user plane interface such as a Uc interface. Also, the AIM 230 can communicate with the offline CAE 232 over a control plane interface such as an Ma interface, and with the offline CAE 232 over a control plane interface such as an Mi interface.

At a high level, when an edge gateway 222 receives a video request from a UE 134, the edge gateway 222 determines the level of adaptation for the requested video. The level of adaptation indicates the extent of adaptations to be performed on the requested video. The edge gateway 222 can determine the level of adaptation for the requested video based on the delivery scenario. The delivery scenario can include the user equipment's video capabilities and the user equipment's network policy. Once the edge gateway 222 determines the level of adaptation, the edge gateway 222 sends a content location request to the AIM 230 to determine how to download the requested video with the indicated level of adaptation.

When the AIM 230 receives the content location request, the AIM 230 determines if the requested video with the indicated level of adaptation is already available from the CDN cache 228. If so, the AIM 230 sends a content location response to the edge gateway 222, indicating that the CDN cache 228 already has an adapted version of the requested video and that the adapted video can be downloaded from the CDN 226; if not, the AIM 230 sends a content location response indicating that the edge gateway 222 downloads the video from the online CAE 224.

The edge gateway 222 analyzes the content location response and sends a video request to the device indicated by the content location response. This video request includes the requested video identifier and the level of adaptation for the requested video. If the device indicated by the content location response is the CDN cache 228, the CDN cache 228 can send the adapted video to the edge gateway 222. If the device indicated by the content location response is the online CAE 224, the online CAE 224 retrieves the original version of the requested video from the video server 136, adapts the received video according to the level of adaptation indicated by the video request, and sends the adapted video to the edge gateway 222.

In the meanwhile, the AIM 230 can update its video popularity table, indicating that one additional video request was received for the requested video with a particular level of adaptation. This would increase the popularity index of the requested video associated with that particular level of adaptation. From hereafter, the requested video with the requested level of adaptation is referred to as the requested content.

If the popularity index associated with the requested content exceeds a predetermined threshold, the AIM 230 can instruct the offline CAE 232 to download the associated video from the video server 136 and adapt the video according to the requested level of adaptation. The offline CAE 232, in turn, downloads the video, adapts the video according to the requested level of adaptation using its transcoder 234, and stores the adapted video in its cache 236. Then, at an appropriate time, the offline CAE 232 can transfer the adapted video to the CDN cache 228 so that edge gateways can download the adapted video directly from the CDN cache 228. This way, popular videos do not have to be adapted multiple times, thereby reducing the required processing power at the online CAE 224.

Figure 4:
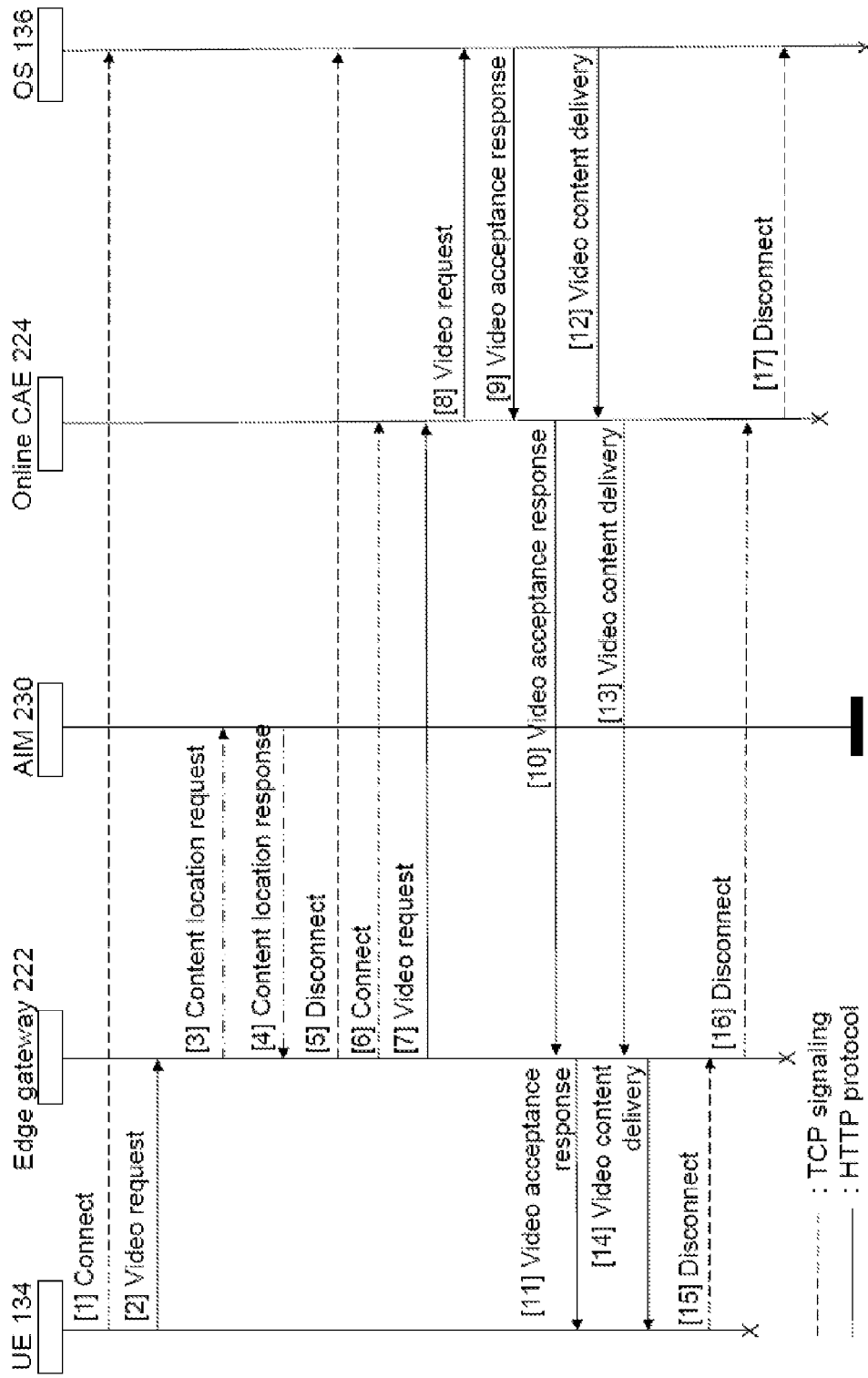
FIG. 4 shows a flow diagram illustrating an intelligent video delivery scheme in accordance with certain embodiments, in which the edge gateway retrieves adapted videos from an online content adaptation engine.
Figure 7:
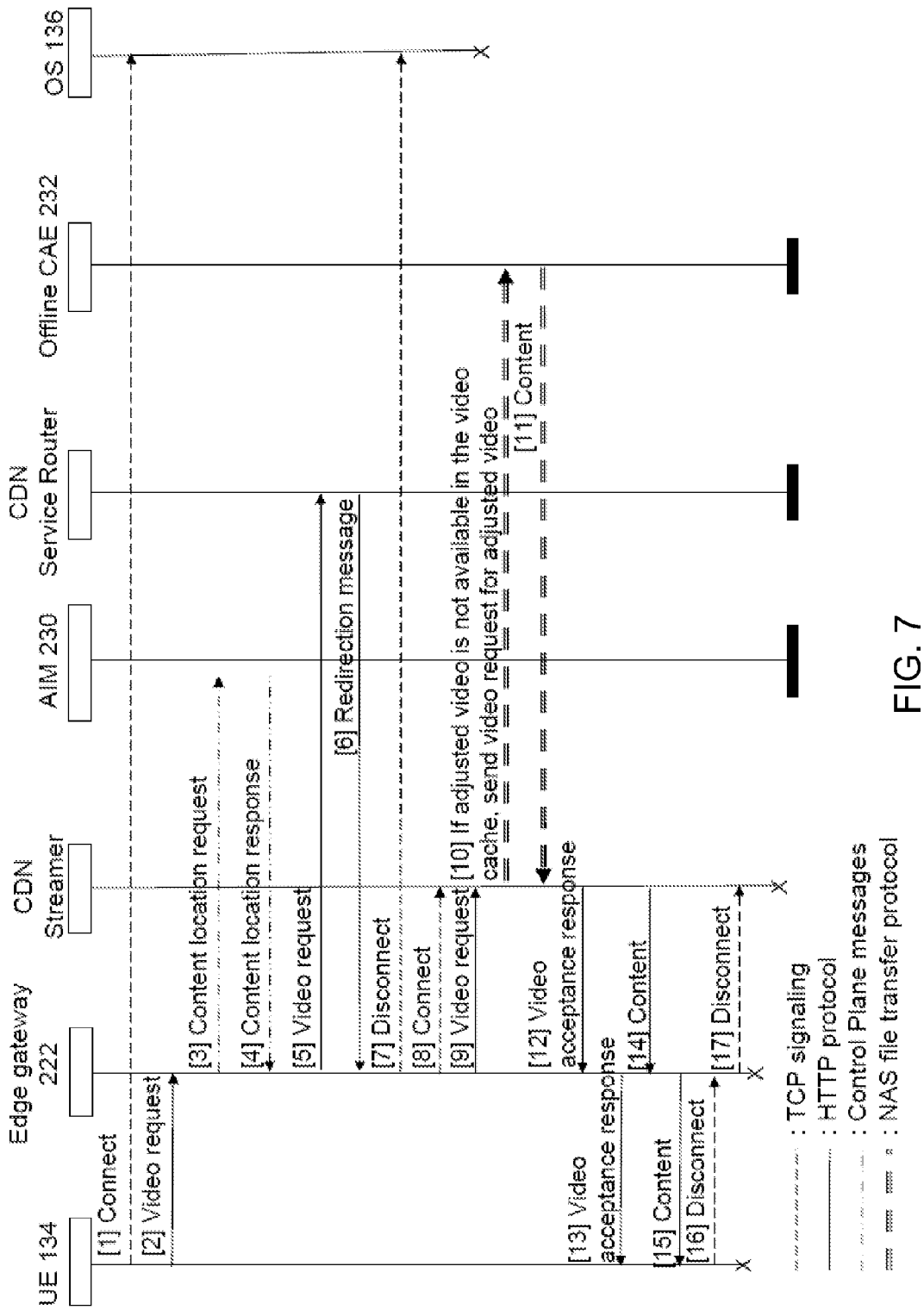
FIG. 7 shows a flow diagram illustrating an intelligent video delivery scheme in accordance with certain embodiments, in which the edge gateway retrieves adapted videos from a content distribution network streamer.
Figure 8:
FIG. 8 shows a flow diagram illustrating an intelligent video delivery scheme in accordance with certain embodiments, in which the asset information manager triggers the CDN cache to populate itself with adapted videos based on the videos' popularity.

FIGS. 4, 7, and 8 show flow diagrams illustrating network operations under the IVD scheme in accordance with certain embodiments. FIG. 4 illustrates a scenario in which the edge gateway 222 receives the adapted video from the online CAE 224 in certain embodiments. FIG. 7 illustrates a scenario in which the edge gateway 222 receives the adapted video from the CDN cache 228 in some embodiments. FIG. 8 illustrates a scenario in which a particular video has become popular and the AIM 230 triggers the offline CAE 232 to prepare an adapted version of the original video in certain embodiments.

FIG. 4 shows a message flow diagram of the IVD scheme in accordance with certain embodiments in which the adapted version of the requested video is not available in the CDN cache 228. Therefore an edge gateway 222 receives the adapted video from the online CAE 224. In step 1, UE 134 establishes a TCP connection with the originating server (OS) 136 to initiate a video transfer. In step 2, the UE 134 sends a video request to the edge gateway 222. The video request can include a video identifier that identifies the requested video, the source address indicating the IP address of the UE 134, and the destination address indicating the originating server. The video identifier can be formatted as a uniform resource identifier (URI). The source address and the destination address in the video request can be formatted as an Internet Protocol (IP) address. This video request can include a hypertext transfer protocol (HTTP) get request or a HTTP partial get request.

Subsequently, the edge gateway 222 receives the video request. To the edge gateway 222, the received video request may look identical to any other data requests. Therefore, the edge gateway 222 may need to analyze the video request to determine that the video request is associated with downloading a video. The video request analysis can include deep packet inspection. Deep packet inspection ("DPI") can include analyzing headers of layer 4, layer 5, layer 6, and layer 7 of the Open Systems interconnection model ("OSI model"). In particular, DPI of the video request can include matching the video request's header to hostnames that are known to be associated with video contents. The DPI can also include analyzing the video identifier in the video request to identify the originating server of the requested content. If the identified originating server is a video server, then the DPI indicates that the requested content is a video content. Once the DPI indicates that the received data request is a video request, the edge gateway 222 can proceed to step 3 of FIG. 4. If not, then the edge gateway 222 can relay the received data request to the hostname identified in the received data request.

In certain embodiments, DPI of the video request can mischaracterize the received video request as a non-video request. To address this issue, the edge gateway 222 has a confirmation mechanism that checks whether the data request identified as a non-video request is in fact a non-video request. The confirmation mechanism can include analyzing the response to the relayed data request. As discussed above, when the DPI indicates that the received data request is a non-video request, the edge gateway 222 relays the received data request to the hostname identified in the received data request. When the edge gateway 222 receives a response to the relayed data request, the edge gateway 222 can perform deep packet inspection on the response. If the response to the relayed data request is a HTTP Response, DPI can include matching the HTTP Response header to one of the known video types. If the HTTP Response header indicates that the requested data is one of the known video types, then the gateway can tag the data flow associated with this HTTP Response as a video flow. The known video types can include known video standards, for example, a MPEG-4 or H.264.

In some embodiments, the confirmation mechanism can include analyzing the data content. For example, if the data content is formatted as a HTTP payload, the gateway 222 can retrieve the data content from the HTTP payload. The gateway 222 can then analyze the header of the data content to determine the format of the requested data content. If the format of the requested data content is one of known video formats, such as a MPEG-4 or H.264, then the gateway can tag the data flow associated with this data content as a video flow. Further embodiments and techniques for identifying video flows is described in detail in U.S. patent application Ser. No. 13/309,711 by Bhupalem et al., filed on an even date herewith, entitled "SYSTEMS AND METHODS FOR CLIENT TRANSPARENT VIDEO READDRESSING," which is hereby incorporated by reference in its entirety.

Once the edge gateway 222 determines that the data flow is associated with a video transfer, the edge gateway 222 can determine the level of adaptation to be associated with the requested video. In certain embodiments, the edge gateway 222 indicates the level of adaptation that is performed on the requested video using a numerical index. A high numerical index indicates a high video quality; a low numerical index indicates a low video quality. In certain embodiments, the numerical index can be an adaptation profile index (API). The API helps the AIM 230 to associate different versions of the same video in a relative order of quality. In certain embodiments, the content determination module uses the following values for the API:

Value 1—Lowest Quality (shallow color depth and small frame size)
Value 2—Low Quality
Value 3—Medium Quality
Value 4—High Quality (deep color depth and large frame size)
Value 5—The original unmodified quality The edge gateway 222 can determine the API for the requested video using a content determination module. The content determination module can consider a video download scenario to determine the API for the requested video. The video download scenario can include one or more of a video identifier, video capabilities associated with the user equipment, network policy associated with the user equipment, and the network condition. The video identifier can include the video's uniform resource identifier (URI) or the Internet Protocol (IP) address of the video server 136 and the file name in the video server. In certain embodiments, the video identifier can be retrieved from the video request. The video identifier can be used to identify the characteristics of the requested video, for instance, the video frame size, the compression rate, and the color quantization level.

The video capabilities associated with the user equipment can include video features associated with the user equipment, for example, the screen size/resolution, mobile operating system, browser and browser capabilities, supported video coders/decoders (codec), display gamut and color depth, mobile CPU capability (e.g., speed, RAM, CPU architecture etc.) supported communications bit rates, supported frame rates, audio capability (e.g., mono/stereo/speaker parameters), and zoom capability.

In certain embodiments, the edge gateway 222 can identify the video capabilities by analyzing video requests. For example, if a video request was sent by user equipment in the iPhone device class, the user-agent field in the video request's header would indicate that the video request was sent by Safari Mobile. Therefore, the edge gateway 222 can analyze the user-agent field in the video request's header to determine the video capabilities associated with the user equipment. In other embodiments, the edge gateway 222 can receive the video capabilities as a control message from the user equipment to the edge gateway 222. In certain embodiments, user equipments with similar capabilities are grouped together under the same device class, for example, an iPhone device class, an iPad device class, a Motorola Razr class, a Galaxy Tab device class etc.

The network policy can include the network speed (i.e., bit rate) policy associated with the user equipment. The network speed can indirectly indicate the maximum real-time video quality that can be provided to the user equipment. The network policy can also include eligible services at different time of operation, for example, a premium bit rate service at night and a standard bit rate service during rush hours. In some cases, the network policy can include minimum video frame rate for the user equipment, the maximum allowed packet loss for the user equipment, an option to enable/disable video transcoding for the user experience, and an option to enable/disable the CDN cache. In certain embodiments, the network policy for user equipment can be retrieved from a policy server. The edge gateway 222 can send a policy request to the policy server, for example, a policy charging and rules function (PCRF), and receive a policy response indicating the network policy associated with the user equipment.

The network condition information can include network congestion information. For example, the network congestion information can include the amount of additional data traffic that can be handled by the network. The network congestion information can also include the average throughput of network devices in a network. The average throughput can be measured in terms of bytes per second.

Each factor of the video download scenario can impose an upper bound on the quality of the downloaded video. For example, if the user equipment 134 can only view VGA-quality videos (i.e., 640×480 pixels) then the video frame size of the requested video can be limited to 640×480 pixels. Also, if the maximum bit rate for the user's policy is 200 kb/s, then the quality of the requested video can be limited to meet the bandwidth constraint. Each of these upper bound quality limits can be translated into an API.

In certain embodiments, the content determination module can compute an API with respect to each of the factors in the video download scenario. Then the content determination module can set the final API for the requested video to be the minimum of computed APIs. In other words, $$API_{FINAL} = \min_{i \in DS} API_i$$

where the set DS indicates the video download scenario, and $API_i$ indicates the API computed with respect to the $i^{th}$ factor of the video download scenario. For example, if the network policy indicates that the user equipment is eligible for 50 kbps of data rate, then the content determination module can set the $API_{network\ policy}$ to be 2. If the screen size of the user equipment is 640×480 pixels, then the content determination module can set the $API_{video\ capability}$ to be 4. If the network condition information indicates that the average throughput of the network is 100 kbps, then the content determination module can set the $API_{network\ condition}$ to be 3. Therefore, in this example, $API_{FINAL}$ would be 2.

In certain embodiments, the API can include two numbers, one for the video resolution and another for the video bit rate: $API_i = [API^{res}_i, ApI^{bitrate}_i]$. In this case, the content determination module can compute the final API for the resolution and the bit rate independently, and concatenate the two to determine the final API for the requested video. In some embodiments, $API^{bitrate}_i$ can be represented as a percentage of the requested video's original bit rate.

In step 3, once the edge gateway 222 determines the API for the requested video, the edge gateway 222 sends the content location request to the AIM 230. The content location request includes, among other things, the video request received from the user equipment and the API associated with the requested video. The edge gateway 222 can send the content location request using an out-of-band control plane, for example, an Mc interface, using an Extensible Markup Language (XML) Content Retrieve Request (CRReq) message format, Cisco's proprietary format. When the AIM 230 receives the content location request, the AIM 230 can perform one or more of the following operations: tracking the popularity of the requested content, and determining if the CDN cache 228 has the requested content.

In certain embodiments, the AIM 230 tracks the popularity of contents using a popularity table. FIG. 5 shows a popularity table in accordance with certain embodiments. This popularity table has three columns: the first column indicates the video using a video identifier, the second column indicates the API associated with the video, and the third column indicates the popularity index associated with the video in the first column and the API in the second column. The AIM 230 can compute the popularity index based on the number of times the associated video was requested by users. For example, the AIM 230 can maintain a counter for each video content, and whenever the AIM 230 receives a content location request for one of the video contents, the AIM 230 can increase the value of the counter for the requested video content. The AIM 230 can then derive the popularity index for the requested video content using the value of the counter associated with the requested video content. In certain embodiments, the counter value itself can be the popularity index.

In certain embodiments, the AIM 230 uses a CDN cache table to determine if the requested video content is already available in the CDN cache 228. FIG. 6 shows a CDN cache table in accordance with certain embodiments. The CDN cache table can include four columns. The first column indicates a video using a video identifier. The second column indicates the API associated with the video. The third column indicates the source address of the CDN streamer engine from which the adapted video can be downloaded. The fourth column indicates an expiration time at which the source address identified is no longer valid. The source address in the third column can be represented using a uniform resource identifier (URI) format, an IP address format, or a proprietary internal address format. In certain embodiments, the CDN cache table can be merged with the popularity table of FIG. 5 into a single table.

The AIM 230 can use the CDN cache table the following way to determine if the requested video content is already available in a CDN cache 228. When the AIM 230 receives a content location request from the edge gateway 222, the AIM 230 can retrieve, from the CDN cache table, the source address of the CDN streamer engine and the expiration time associated with the requested video content. If the source address field in the CDN cache table is not empty and if the expiration time associated with the source address has not yet passed, then the AIM 230 determines that the adapted video is available in the CDN cache 228. If the source address field in the CDN cache table is empty and/or if the expiration time associated with the source address has passed, then the AIM 230 determines that the adapted video is not available in the CDN cache 228.

In step 4, upon analyzing the CDN cache table, the AIM 230 can send a content location response to the edge gateway 222. The content location response includes, among other things, the source address of the CDN streamer engine from which the adapted video can be downloaded. The AIM 230 can send the content location response over an out-of-band control plane, such as an Mc interface, as an XML Content Retrieve Response (CRRsp) message.

Since FIG. 4 deals with a scenario in which the adapted video content is not available in the CDN cache 228, the source address in the content location response will indicate that the edge gateway 222 should download the video from the online CAE 224. In certain embodiments, to indicate that the edge gateway 222 downloads the adapted video from the online CAE 224, the content location response can explicitly specify the IP address of the online CAE 224. In other embodiments, to indicate that the edge gateway 222 downloads the adapted video from the online CAE 224, the content location response can include a <null> source address.

In step 5, the edge gateway 222 disconnects its TCP connection with the originating video server 136. In step 6, the edge gateway 222 establishes a new TCP connection with the online CAE 224, and in step 7, the edge gateway 222 sends a new video request to the online CAE 224. The new video request can include the video request received in step 2 and can further include additional information, including one or more of the following: the API for the requested video, the IP address of the originating server 136, and the IP address of the user equipment 134 requesting the video. The edge gateway 222 can format the new video request as a HTTP get request. The HTTP get request can include the additional information as X-headers. X-headers are non-standard or proprietary add-ons to the regular fields in an HTTP header.

In certain embodiments, the network can have multiple online CAEs. In this case, in step 7, before establishing a new connection, the gateway 222 can select one of the CAEs to serve the current video data flow. The CAE selection can be random, round-robin, or adaptive. In a random CAE selection mode, the gateway 222 randomly selects one of the online CAEs for the current video data flow. In a round-robin CAE selection mode, the gateway 222 selects the online CAEs sequentially. For example, if the previous video data flow was assigned to online $CAE_{(n-1)}$, the current video data flow is assigned to online $CAE_n$. If the network does not have online $CAE_n$, then the current video data flow is assigned to online $CAE_1$.

In an adaptive CAE selection mode, the gateway 222 selects one of the online CAEs based on the online CAEs' load condition. For example, if online $CAE_m$ is using 85% of its computational power to adapt other videos and if online $CAE_n$ is using 20% of its computational power to adapt other videos, then the gateway 222 can select online $CAE_n$ for the current video data flow. Such an adaptive CAE selection scheme can reduce the load imbalance across the online CAEs and reduce the risk of online CAE failures. The gateway 222 can receive the CAE load information from each of the online CAEs by querying the online CAEs over a control plane.

In step 8, the online CAE 224 relays the video request to the originating video server 136. In step 9, the originating server 136 accepts the video request and sends a video request acceptance response. The video request acceptance response can be formatted as an HTTP 200 ok response. In steps 10 and 11, the online CAE 224 relays the video request acceptance response to the edge gateway 222, which then relays the video request acceptance response to the user equipment 134.

In step 12, the originating server 136 starts delivering the original version of the requested video to the online CAE 224. The originating server 136 can deliver the video as an HTTP payload. Once the online CAE 224 receives the original version of the requested video, the online CAE 224 adapts the video according to the API.

Once the online CAE 224 receives the original version of the requested video, the online CAE 224 adapts the received video for the UE 134. In certain embodiments, a CAE can adapt one or more of the following video characteristics: the frame size, the aspect ratio, the compression rate, compression format, motion vector estimate, and the frame rate. The following paragraphs illustrate how a CAE adapts these video characteristics in accordance with certain embodiments.

A CAE can adapt the video's frame size or the frame's aspect ratio to match the frame size to the UE's screen. Adapting the frame size and/or the aspect ratio may involve decoding a frame, down-sampling the frame, resizing the frame, and re-encoding the frame with the possible reuse of motion vectors. A CAE can also adapt the video compression rate. This can involve modifying the quantization scale of discrete cosine transform (DCT) coefficients or modifying the quantization scale of colors.

In addition, a CAE can also modify the compression format of the videos. For example, if a video is encoded using MPEG 2 but the CAE can encode the video using a more efficient compression algorithm such as H.264, then the CAE can decode the video and re-encode the video using the more efficient compression format. Instead of re-encoding the video using a different compression format, the CAE can also use the same compression format but modify the motion vector estimates for the compressed video. For example, if the original video was compressed using inaccurate motion vectors, then the CAE can re-compress the video using more accurate motion vectors. To this end, the CAE can decode the video, estimate better motion vectors for the video, and re-encode the video using the better motion vectors.

A CAE can also adapt the video frame rate. This may involve temporally sub-sampling the video frames or dropping one or more B frames (i.e., bi-predictive picture). A CAE can determine which of these video characteristics should be adapted based on its load condition and the latency requirements from the network.

In steps 13-14, the online CAE 224 delivers the adapted video to the edge gateway 222, and the edge gateway 222 relays the adapted video to UE 134. In steps 15-17, once the adapted video has been fully downloaded or once the user aborts the video download, the UE 134 disconnects its TCP session with the edge gateway 222. This triggers the edge gateway 222 to disconnect its TCP session with online CAE 224, and the online CAE 224 in turn disconnects its TCP session with the originating server 136.

In certain embodiments, if the UE 134 sends additional video requests to the edge gateway 222 over the same data connection established in step 1, or if the UE 134 sends additional video requests to the edge gateway 222 over a data connection that is correlated with the data connection established in step 1, then the edge gateway 222 routes these video requests to the online CAE 224 without performing the DPI on these video requests. This feature is called the connection persistency.

Connection persistency is useful because this feature can ensure that a UE 134 does not download portions of a single video from multiple network devices. Suppose that a UE 134 sends multiple HTTP partial get requests to the edge gateway 222 to download different portions of the same video in parallel. Without the connection persistency feature, the edge gateway 222 may route each of these partial get requests to different network devices. For example, the edge gateway 222 can route the first partial get request to a first CAE that had cached an adapted version of the video, whereas the same edge gateway 222 can route the second partial get request to a second CAE that had not cached an adapted version of the video. This can cause the video quality variations and the packet latency variations across different parts of the video, thereby degrading the user experience. The connection persistency feature resolves these issues.

The connection persistency can be implemented using a persistency table. In certain embodiments in which the data connection is established using TCP, the persistency table can have two columns, one column indicating the source port of the TCP data flow and another column indicating the network device to which the TCP data flow should be readdressed. When a edge gateway 222 receives a video request, the edge gateway 222 can identify the TCP source port associated with the video request (i.e., TCP data flow), search the persistency table to identify the network device to which the video request should be readdressed, and proxy the video request to the identified network device. The edge gateway 222 can identify the TCP source port associated with the video request by reading the source port field of the L4 (TCP) header in the video request. If the persistency table does not have an entry associated with the identified TCP source port, the edge gateway 222 can proceed with a DPI of the video request to determine the destination of the video request.

In certain embodiments, connection persistency can be enforced across TCP connections. Suppose that a UE 134 sends multiple HTTP partial get requests to the edge gateway 222 over multiple TCP connections. In this case, the edge gateway 222 can correlate the TCP connections to identify TCP connections that are downloading different parts of the same video. Upon identifying correlated TCP connections, the edge gateway 222 can assign the same destination network device to these TCP connections using the persistency table. This enforces the connection persistency feature across these correlated TCP connections. Methods and systems for correlating TCP connections is disclosed in a related U.S. patent application Ser. No. 13/252,574, by Hsu et al., filed on Oct. 4, 2011, entitled "SYSTEMS AND METHODS FOR CORRELATING MULTIPLE TCP SESSIONS FOR A VIDEO TRANSFER", which is herein incorporated by reference in its entirety.

FIG. 7 shows a message flow diagram of the intelligent video delivery scheme in accordance with certain embodiments in which the adapted version of the requested video is available in the CDN cache 228. In this case, the edge gateway 222 can receive the cached video through a CDN streamer. The same description for FIG. 4 steps 1-3 can be used to describe steps 1-3 of FIG. 7. When the AIM 230 receives the content location request from the edge gateway 222, the AIM 230 performs two operations: the AIM 230 tracks the popularity of the requested video content, and the AIM 230 determines if the CDN cache 228 has the requested video content. In certain embodiments, the AIM 230 tracks the popularity of video contents using a popularity table as discussed with respect to FIG. 4 and FIG. 5. Also, in certain embodiments, the AIM 230 uses a CDN cache table to determine if the CDN cache 228 has the requested video content, as discussed with respect to FIG. 4 and FIG. 6.

In step 4, upon analyzing the CDN cache table, the AIM 230 can send a content location response to the edge gateway 222. As was described with respect to FIG. 4, the content location response includes, among other things, the source address from which the adapted video can be downloaded. Since FIG. 7 deals with a case in which the adapted video content is available in the CDN cache 228, the source address in the content location response is not <null>. The source address in the content location response can be the URI of the CDN cache 228 or an IP address of the CDN streamer from which the video content in the CDN cache 228 can be downloaded. If the source address is the URI of the CDN cache 228, the content location response can optionally include the IP address of the CDN service router. This allows the edge gateway 222 to communicate with the CDN service router to translate (i.e., resolve) the URI of the CDN cache 228 to the IP address of the CDN streamer engine. These steps are illustrated in steps 5-6. If the source address already specifies the IP address of the CDN streamer engine, then the edge gateway 222 can skip steps 5-6 that involves translating the URI of the CDN cache 228 to the IP address of the CDN streamer engine.

In step 5, if the content location response includes the URI of the CDN cache 228, the edge gateway 222 sends a new video request to the CDN service router to translate the URI of the CDN cache 228 to the IP address of the CDN streamer engine. The new video request includes the URI of the CDN cache 228. In some embodiments, if there are multiple streamer engines that are capable of accessing the CDN cache 228, the service router is configured to select one of the CDN streamer engines that can stream the requested video content to the edge gateway 222.

In step 6, once the service router selects the CDN streamer engine, the service router can send a redirection message to the edge gateway 222. The redirection message can include the IP address of the selected CDN streamer engine, thereby instructing the edge gateway 222 to send a video request to the selected streamer engine. The redirection message can be a HTTP 302 message.

In steps 7-8, the edge gateway 222 disconnects the TCP session with the originating server 136 and establishes a new TCP session with the CDN streamer engine specified in the redirection message. In step 9, the edge gateway 222 sends a video request to the CDN streamer engine. The video request can include the source address of the adapted video that was included in the content location response.

In step 10, the CDN streamer engine can determine if the CDN cache 228 has finished downloading the adapted video from the offline CAE 232. If the CDN cache 228 already has finished downloading the adapted video, the CDN streamer engine can skip steps 10-11 and directly go to step 12. If the CDN cache 228 has not finished downloading the adapted video, the CDN streamer engine can trigger the offline CAE 232 to send the adapted video to the CDN cache 228 and/or wait until the CDN cache 228 finishes receiving the adapted video from the offline CAE 232. To trigger the offline CAE 232 to send the adapted video to the CDN cache 228, in step 10, the CDN streamer engine can send a video request to the offline CAE 232. In step 11, in response to the video request, the offline CAE 232 delivers the adapted video to the CDN cache 228. The CDN streamer engine and the offline CAE 232 can communicate using a network attached storage (NAS) file transfer protocol.

In steps 12-13, once the adapted video is available at the CDN cache 228, the CDN streamer engine sends a video request acceptance response to the edge gateway 222, and the edge gateway 222 relays the video request acceptance response to the UE 134. The video request acceptance response can be an HTTP 200 OK message. In step 14, the CDN streamer engine streams the adapted video from the CDN cache 228 to the edge gateway 222, and in step 15, the edge gateway 222 relays the adapted video to the UE 134. In steps 16-17, once the adapted video has been fully downloaded or once the user aborts the video download, the UE 134 disconnects its TCP session with the edge gateway 222. This triggers the edge gateway 222 to disconnect its TCP session with the CDN streamer engine.

As discussed with respect to FIG. 5, in certain embodiments, the AIM 230 can maintain a popularity table that indicates the popularity of videos at different APIs. The AIM 230 uses this popularity table to determine if the offline CAE 232 should adapt popular videos and store them in the CDN cache 228. If a certain adapted video becomes popular enough, the AIM 230 triggers the offline CAE 232 to prepare an adapted video and store the adapted video in the CDN cache 228.

FIG. 8 shows a flow diagram of the IVD scheme in accordance with certain embodiments in which an adapted video is not available at the CDN cache 228, but the adapted video has become popular among the users. Therefore, the AIM 230 triggers the offline CAE 232 to prepare an adapted video and store the adapted video at the CDN cache 228. In step 1, as discussed with respect to FIGS. 4 and 7, the edge gateway 222 determines the API for the requested video and sends a content location request to the AIM 230. This content location request includes, among other things, the video identifier and the API.

In step 2, when the AIM 230 receives the content location request, the AIM 230 can update its popularity table for the requested video content. While updating the popularity table, the AIM 230 can determine if the popularity index associated with the requested video is higher than a predetermined popularity threshold. If so, the AIM 230 can trigger the offline CAE 232 to prepare an adapted video.

In step 3, the AIM 230 sends a video adaptation request to the offline CAE 232. The video adaptation request can include the video request from the UE 134 and additional information indicating one or more of the following: the address of the originating video server 136, the API associated with the requested video, and the address of the AIM 230. The address of the AIM 230 can be formatted as a URI. The AIM 230 can send the video adaptation request over an XML/TCP control plane. In particular, the AIM 230 can send the video adaptation request in an XML CRReq message format.

In step 4, in response to the video adaptation request, the offline CAE 232 establishes a TCP session with the originating server 136, and in step 5, the offline CAE 232 sends a new video request to the originating server 136. This new video request includes the video request the edge gateway 222 received from the UE 134. In steps 6-7, the originating server 136 accepts the video request and sends the video in its original form to the offline CAE 232. In step 8, once the offline CAE 232 finishes receiving the video from the originating server 136, the offline CAE 232 disconnects its TCP session with the originating server 136. Then the offline CAE 232 uses its video transcoder 234 to adapt the received video into an adapted video in accordance with the requested API. Once the offline CAE 232 finishes adapting the video, the offline CAE 232 can store the adapted video in its cache (i.e., the network attached storage 236).

Subsequently, the offline CAE 232 is configured to select one of a plurality of CDN caches for storing the adapted video. To this end, the offline CAE 232 can analyze the amount of available memory space in each of the plurality of CDN caches. Once the offline CAE 232 selects the CDN cache 228, the offline CAE 232 can schedule to send the adapted video in its cache 236 to the CDN cache 228.

If none of the suitable CDN caches has enough space to store the adapted video, the offline CAE 232 can trigger one of the CDN caches to remove one or more cached video from its memory space and replace them with the newly adapted video. To determine which cached video should be removed, the CDN cache 228 (or a processor for the CDN cache 228) can analyze one or more of the following factors associated with the cached videos: popularity (i.e., how many times the cached video was accessed), age (i.e., how long ago the video was placed into the cache), and file size.

In step 9, the offline CAE 232 can send a video adaptation response to the AIM 230, indicating that the adapted video has been prepared. The video adaptation response can include the source address at which the adapted video can be located, and the response can also include an expiration time at which the adapted video will expire (i.e., be removed). The video adaptation response can be sent over an XML/TCP control plane. Once the AIM 230 receives the video adaptation response, the AIM 230 updates its CDN cache table accordingly. For example, the AIM 230 updates the row associated with the adapted video (i.e., the video identifier and the API) with the source address and the expiration time in the video adaptation response.

In certain embodiments, each adapted video can be associated with one of a plurality of video content classes and can be treated according to the associated video content class. For example, the AIM 230 can use different a predetermined popularity thresholds based on the associated video content classes; the AIM 230 can use different expiration time based on the associated video content classes.

Video content classes can be determined based on the video server's URI and/or a platform for internet content selection (PICS) rating. For example, if an originating video server 136 is associated with espn.com or sports.*.com, then the videos from the originating video server 136 can be treated as a sports class. If an originating video server 136 is associated with cnn.com or news.*.com, then the videos from the originating video server 136 can be treated as a news class. In certain embodiments, the AIM 230 can monitor the expiration time in the CDN cache table and trigger the offline CAE 232 to re-adapt popular yet soon-to-be-expired adapted videos.

In certain embodiments, the AIM 230 can monitor the popularity indices associated with different versions of the same video and trigger the offline CAE 232 to prepare an adapted version even if that particular version is not popular enough among the users. For example, when a US Open final match video is popular at API of 2 and 4, there is a high likelihood that the same video would be popular at API of 3 as well. Therefore, even if the US Open final match video at API of 3 is not popular enough, the API may decide to prepare an adapted version for API of 3.

Figure 9:
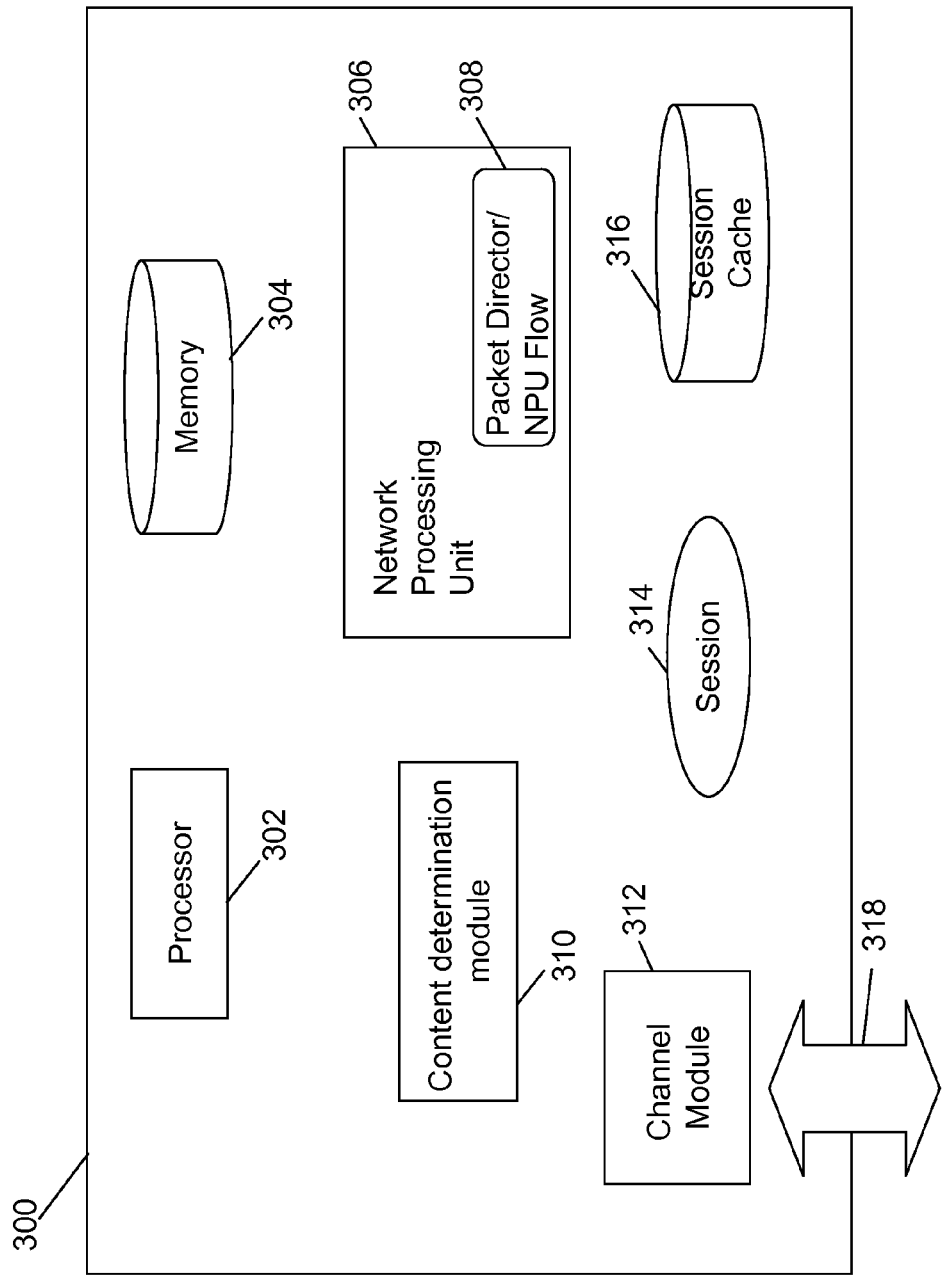
FIG. 9 shows a logical diagram of an edge gateway in accordance with certain embodiments.

FIG. 9 illustrates a logical view of a gateway 300 in accordance with certain embodiments. The gateway 300 can include one or more of a processor 302, a memory 304, a network processing unit (NPU) 306, a packet director/NPU flow 308, a content determination module 310, a channel module 312, a session 314, a session cache/database 316, and an interface 318.

The content determination module 310 is configured to determine the API for requested videos. The content determination module can consider one or more of the following elements to determine the API: a video identifier, user equipment capabilities, and policy associated with the user equipment. These elements were described in detail with respect to FIG. 4. The content determination module 310 can be implemented in software and stored in memory 304. Memory 304 can be implemented in a variety of fashions such as a non-transitory computer readable medium, a programmable read only memory (PROM), a magnetic media, or flash memory. The software can run on a processor 302 that executes instructions or computer code. The content determination module 310 may also be implemented in hardware using an application specific integrated circuit (ASIC), programmable logic array (PLA), or any other integrated circuit.

An interface 318 can provide an input and/or output mechanism to communicate with other network devices. The interface 318 can provide communication with other gateways, application servers, and user equipment 134, as well as other core network nodes to send and receive control data. The interface 318 can be implemented in hardware to send and receive signals in a variety of mediums, such as optical, copper, and wireless, and in a number of different protocols some of which may be non-transient.

Figure 10:
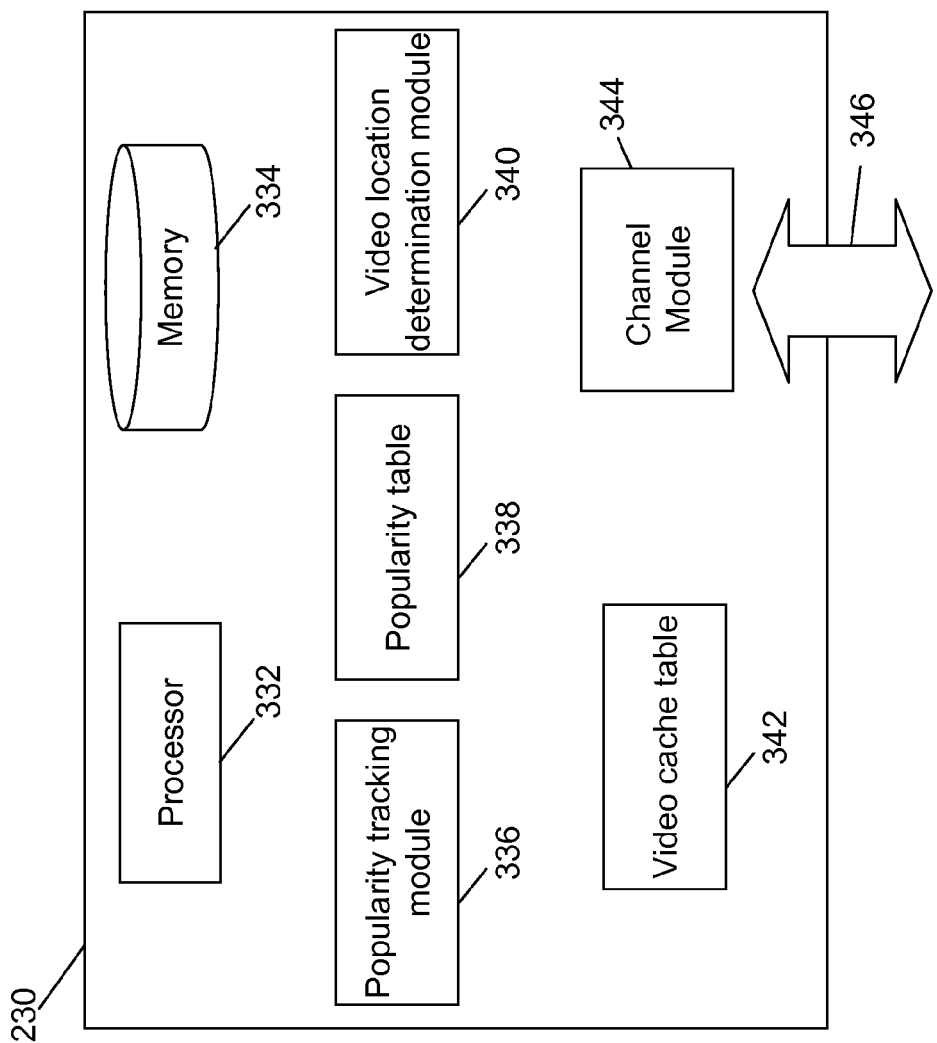
FIG. 10 shows a logical diagram of an asset information manager in accordance with certain embodiments.

FIG. 10 illustrates a logical view of an asset information manager (AIM) 230 in accordance with certain embodiments. The AIM 230 can be a stand-alone server or a part of a server running in a data center. The AIM 230 can include one or more of a processor 332, a memory 334, a popularity tracking module 336, a popularity table 338, a video location determination module 340, a CDN cache table 342, a channel module 344, and an interface 346.

A popularity tracking module 336 is configured to track the popularity indices of videos and maintain the popularity indices at a popularity table 338. The popularity tracking module 336 can compute the popularity index from the number of times the video was requested by users.

A video location determination module 340 is configured to determine the location of the requested video at the requested API. In certain embodiments, the video location determination module 340 can use a CDN cache table 342 to determine the location of the requested video.

The popularity tracking module 336 and the video location determination module 340 can be implemented in software stored in memory 304. Memory can be implemented in a variety of ways such as a non-transitory computer readable medium, a programmable read only memory (PROM), a magnetic media, or flash memory. The software can run on a processor 302 that executes instructions or computer code. video location determination module 340 may also be implemented in hardware using an application specific integrated circuit (ASIC), programmable logic array (PLA), or any other integrated circuit. The CDN cache table 342 can be implemented using the memory 304 such as a non-transient computer readable medium, a programmable read only memory (PROM), or flash memory.

User Equipment and Gateway

The user equipment 134 described above can communicate with a plurality of radio access networks using a plurality of access technologies and with wired communications networks. The user equipment 134 can be a smart phone offering advanced capabilities such as word processing, web browsing, gaming, e-book capabilities, an operating system, and a full keyboard. The user equipment 134 may run an operating system such as Symbian OS, iPhone OS, RIM's Blackberry, Windows Mobile, Linux, Palm WebOS, and Android. The screen may be a touch screen that can be used to input data to the user equipment 134 and the screen can be used instead of the full keyboard. The user equipment 134 may have the capability to run applications or communicate with applications that are provided by servers in the communications network. The user equipment 134 can receive updates and other information from these applications on the network.

The user equipment 134 also encompasses many other devices such as televisions (TVs), video projectors, set-top boxes or set-top units, digital video recorders (DVR), computers, netbooks, laptops, and any other audio/visual equipment that can communicate with a network. The user equipment 134 can also keep global positioning coordinates, profile information, or other location information in its stack or memory. The user equipment 134 can have a memory such as a computer readable medium, flash memory, a magnetic disk drive, an optical drive, a programmable read-only memory (PROM), and/or a read-only memory (ROM). The user equipment 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment 134 can also provide a variety of user interfaces such as a keyboard, a touch screen, a trackball, a touch pad, and/or a mouse. The user equipment 134 may also include speakers and a display device in some embodiments.

The intelligent video delivery scheme described above can be implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). The intelligent video delivery scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintain traffic management for the mobile node. The offload gateway can be implemented as any combination of the following including an xGSN, an xGW, an xGW-SGW, and an xGW-PGW.

Figure 11:
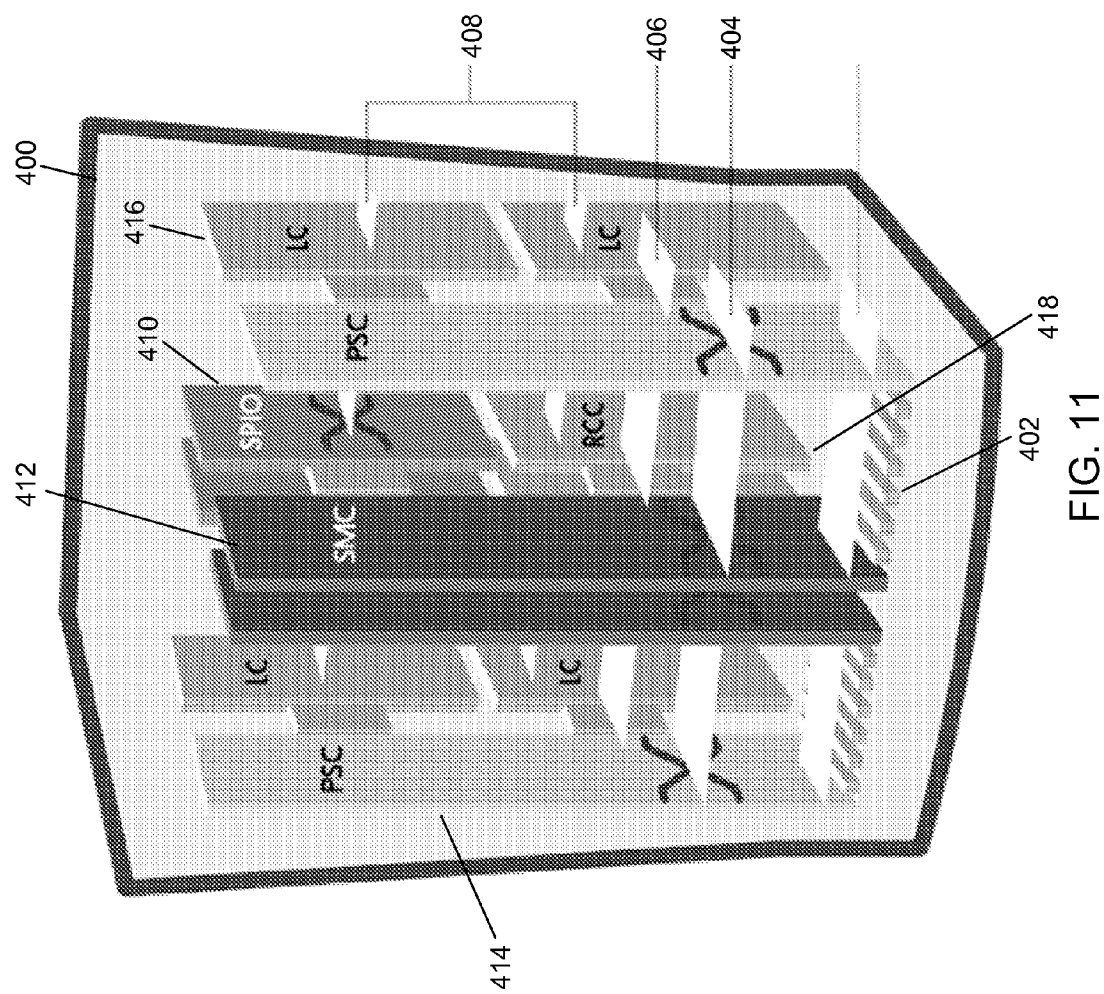
FIG. 11 illustrates a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 11 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 12:
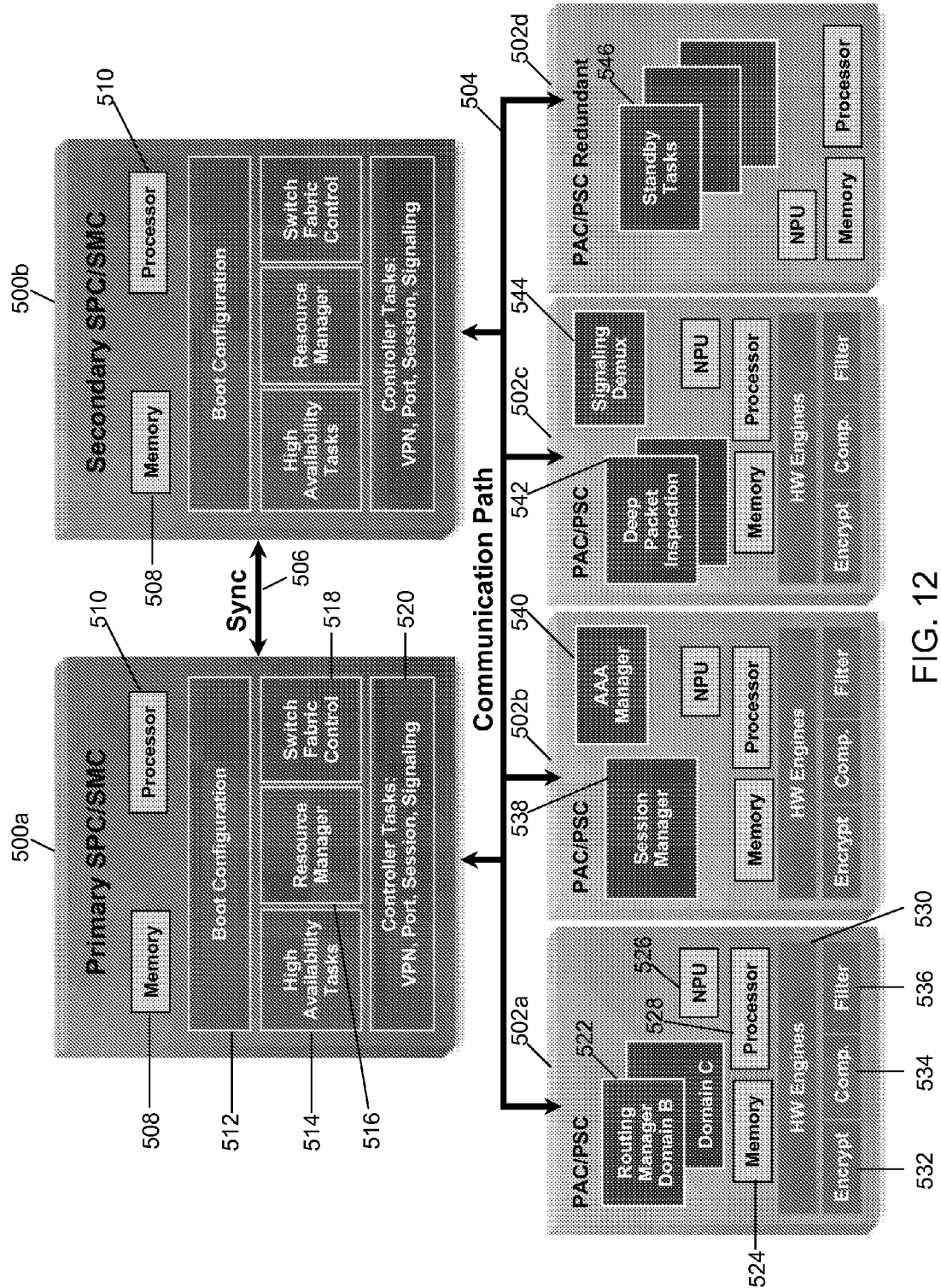
FIG. 12 illustrates a logical view of the software architecture of a network device in accordance with certain embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 12 illustrates a logical view of the software architecture of a network device in accordance with certain embodiments. As shown, the software and hardware can be distributed within the network device and across different circuit boards, processors, and memory. FIG. 12 includes a primary switch processor card (SPC)/system management card (SMC) 500*a*, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment 134.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment 134. A session allows user equipment 134 to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the content determination module can be located in the AIM 230.

We claim:

1. A method performed at a gateway in communication with a user equipment over a communication network, the method comprising:
   receiving a first request from the user equipment over a first data connection, wherein the first request includes a video identifier of a video requested by the user equipment;
   performing deep packet inspection of the first request to determine that the first request is a request for the video associated with the video identifier;
   determining a level of adaptation for the video based on a network policy and video capabilities associated with the user equipment, wherein the level of adaptation includes a first parameter indicative of a video resolution and a second parameter indicative of a video bit rate, and wherein the first parameter and the second parameter are determined independently;
   sending, by the gateway, a content location request to an asset information manager (AIM), requesting the AIM to provide an address of a source device from which the video adapted to the level of adaptation can be received, wherein the content location request includes the video identifier of the requested video and the level of adaptation for the requested video;
   receiving, at the gateway, a content location response from the AIM that identifies the address of the source device from which to receive the requested video adapted to the level of adaptation;
   sending, at the gateway, a second request for the video to the source device identified in the content location response received from the AIM, wherein the second request includes the video identifier and the level of adaptation to be associated with the video; and receiving a version of the video adapted to the level of adaptation.

2. The method of claim 1, further comprising analyzing a user-agent field in the first request's header to identify the video capabilities associated with the user equipment.

3. The method of claim 1, wherein the network policy includes a bit rate policy associated with the user equipment.

4. The method of claim 1, wherein the video capabilities associated with the user equipment include a screen size of the user equipment.

5. The method of claim 1, wherein identifying the network policy includes receiving the network policy from a policy server.

6. The method of claim 1, wherein sending the content location request to the AIM includes sending an Extensible Markup Language (XML) CRReq message to the AIM using an Mc interface, and wherein receiving the content location response from the AIM includes receiving an XML CRRsp message over an Mc interface.

7. A gateway comprising:
  interfaces configured to provide communication with a user equipment, an asset information manager (AIM), an online content adaptation engine (CAE), and a policy server;
  a memory configured to store a module; and
  a processor configured to run the module that is configured to:
    receive a first request from the user equipment, wherein the first request includes a video identifier of a video requested by the user equipment,
    perform deep packet inspection of the first request to determine that the first request is a request for the video associated with the video identifier,
    determine a level of adaptation to be associated with the video using a network policy and video capabilities associated with the user equipment, wherein the level of adaptation includes a first parameter indicative of a video resolution and a second parameter indicative of a video bit rate, and wherein the first parameter and the second parameter are determined independently,
    send a content location request to the AIM, requesting the AIM to provide an address of a source device from which the video adapted to the level of adaptation can be received, wherein the content location request includes the video identifier of the requested video and the level of adaptation for the requested video;
    receive a content location response from the AIM that identifies the address of the source device from which to receive the requested video adapted to the level of adaptation and
    receive from the source device a version of the video adapted to the level of adaptation.

8. The gateway of claim 7, wherein the module is further configured to receive from the policy server the network policy associated with the user equipment.

9. The gateway of claim 7, wherein the module is configured to derive the video capabilities associated with the user equipment by analyzing a user-agent field of the request's header.

10. The gateway of claim 8, wherein if the content location response identifies the source device using a uniform resource identifier (URI) format, the module further configured to send an additional video request to a service router to receive an Internet protocol (IP) address of the source device.

11. The method of claim 1, wherein the content location response includes the address of a cache in a Content Distribution Network (CDN), indicating that the cache in the CDN maintains the requested video adapted to the level of adaptation.

12. The method of claim 11, wherein the AIM uses a CDN cache table to determine whether the requested video content is available in the cache in the CDN.

13. The method of claim 1, wherein the content location response includes the address of an online Content Adaptation Engine, indicating that the online Content Adaptation Engine can provide the requested video adapted to the level of adaptation.

14. The method of claim 1, further comprising receiving a third request over a second data connection that is correlated with the first data connection, and forwarding the third request to the address of the source device without performing deep packet inspection of the third request.

15. The gateway of claim 7, wherein the content location response includes the address of a cache in a Content Distribution Network (CDN), indicating that the cache in the CDN maintains the requested video adapted to the level of adaptation.

16. The gateway of claim 7, wherein the content location response includes the address of an online Content Adaptation Engine, indicating that the online Content Adaptation Engine can provide the requested video adapted to the level of adaptation.

17. The gateway of claim 7, wherein the module is further configured to receive a second request over a second data connection that is correlated with the first data connection, and to forward the second request to the address of the source device without performing deep packet inspection of the second request.

18. A system comprising:
  an asset information manager (AIM) configured to determine an address of a source device at which a video having a level of adaptation can be received;
  a gateway comprising:
    a memory configured to store a module; and
    a processor configured to run the module that is configured to:
      receive a first request from a user equipment, wherein the request includes a video identifier of the video requested by the user equipment,
      perform deep packet inspection of the first request to determine that the first request is a request for the video associated with the video identifier,
      determine the level of adaptation to be associated with the video using a network policy and video capabilities associated with the user equipment, wherein the level of adaptation includes a first parameter indicative of a video resolution and a second parameter indicative of a video bit rate, and wherein the first parameter and the second parameter are determined independently,
      send a content location request to the AIM, requesting the AIM to provide the address of the source device from which the video adapted to the level of adaptation can be received, wherein the content location request includes the video identifier of the requested video and the level of adaptation for the requested video;
      receive a content location response from the AIM that identifies the address of the source device from which to receive the requested video adapted to the level of adaptation, and
      receive from the source device a version of the video adapted to the level of adaptation.

19. The system of claim 18, wherein the AIM is configured to analyze a Content Distribution Network (CDN) cache table to determine whether a cache in the CDN maintains the video adapted to the level of adaptation.

20. The system of claim 18, wherein the AIM is configured to send a video adaptation request to an offline Content Adaptation Engine (CAE) to cause the offline CAE to adapt the video according to the level of adaptation and to store the adapted video in a cache in the CDN.

* * * * *